United States Patent
Nastrucci

Patent Number: 5,377,557
Date of Patent: Jan. 3, 1995

[54] CUSHIONED MOUNT FOR BICYCLE HANDLEBARS

[76] Inventor: Gianfranco Nastrucci, 21 Contrada Meneghetti, 36061 Bassano Del Grappa, Italy

[21] Appl. No.: 48,228

[22] Filed: Apr. 15, 1993

[51] Int. Cl.⁶ .............................. B62K 21/14
[52] U.S. Cl. .................... 74/551.2; 74/551.1; 280/276; 280/273
[58] Field of Search .............. 74/551.1–551.8; 280/275, 287, 276, 279, 281.1

[56] References Cited

U.S. PATENT DOCUMENTS

| | | | |
|---|---|---|---|
| 553,178 | 1/1886 | Rumbarger | 74/551.2 |
| 4,410,196 | 10/1983 | Ribi | 280/279 X |
| 4,834,412 | 5/1989 | Trema | 280/276 |
| 5,149,119 | 9/1992 | Hwang | 280/287 |
| 5,220,851 | 6/1993 | Flechel | 74/551.6 X |
| 5,241,881 | 9/1993 | Chen | 280/276 X |

FOREIGN PATENT DOCUMENTS

| | | | |
|---|---|---|---|
| 0376802 | 7/1990 | European Pat. Off. | 280/279 |
| 423744 | 4/1911 | France | 74/551.2 |
| 564458 | 12/1923 | France | 74/551.2 |
| 596504 | 10/1925 | France | 74/551.2 |
| 867249 | 10/1941 | France | 74/551.7 |
| 871165 | 4/1942 | France | 74/551.2 |
| 1050197 | 1/1954 | France | 74/551.2 |
| 927972 | 4/1955 | Germany | 74/551.2 |
| 76246 | 9/1934 | Netherlands | 74/551.2 |
| 104632 | 3/1942 | Sweden | 74/551.2 |
| 281209 | 12/1927 | United Kingdom | 74/551.2 |

*Primary Examiner*—Vinh T. Luong
*Attorney, Agent, or Firm*—Dowell & Dowell

[57] ABSTRACT

A mount for bicycle handlebars that is fitted with an elastic element to deaden the stresses transmitted by the front wheel and fork to the handlebars and so also to the arms of the cyclist. The mount is divided into two parts connected by an elastic element, the elasticity of which can be constant or regulated.

15 Claims, 2 Drawing Sheets

CUSHIONED MOUNT FOR BICYCLE HANDLEBARS

BACKGROUND OF THE INVENTION

There are various types of existing handlebar mount that allow handlebars to be put into different positions.

All current handlebar mounts link the handlebars to the fork and wheel rigidly with the result that all stresses are transmitted directly to the arms of the cyclist. This inconvenience is evident during races, particularly in competitions over uneven ground and particularly with bicycles such as mountain bikes.

SUMMARY OF THE INVENTION

In order to resolve this problem a new type of handlebar mount has been designed and realized, which is composed of two parts linked by an elastic element. One of the two parts is rigidly connected to the fork post while the other is integral the handlebars.

An elastic element between the two parts of the handlebar mount absorbs the vertical stresses that would otherwise be transmitted to the arms of the cyclist.

The two parts of the mount are realized and coupled in such a way that the insertion of the elastic elements does not compromise the precision and immediacy of the command of the handlebars over the wheel as well as avoiding the roll of the handlebars around the mount.

The elastic suitable element can be any element job and can be of constant resistance, graduated resistance according to the intensity of the stresses to be absorbed or of regulated resistance, for example by way of a system of pretensioning, or it can have a combination of these possibilities for the regulation of elasticity.

The lower part of the mount is integral with the frame and is fitted with two sockets which allow two small vertical rods to slide in them that are integral with the upper part on to which the handlebars are fixed.

These rods are essential in order to support the strains placed on the handlebars by the cyclist during a race.

The main strains are applied to the extremities of the handlebars and act in a vertical direction. The rods are able to maintain the constant seating of the handlebars allowing at the same time the vertical sliding of the handlebars with respect to the frame.

DETAILED DESCRIPTION OF THE PREFERRED EMBODIMENT

Figure 1:
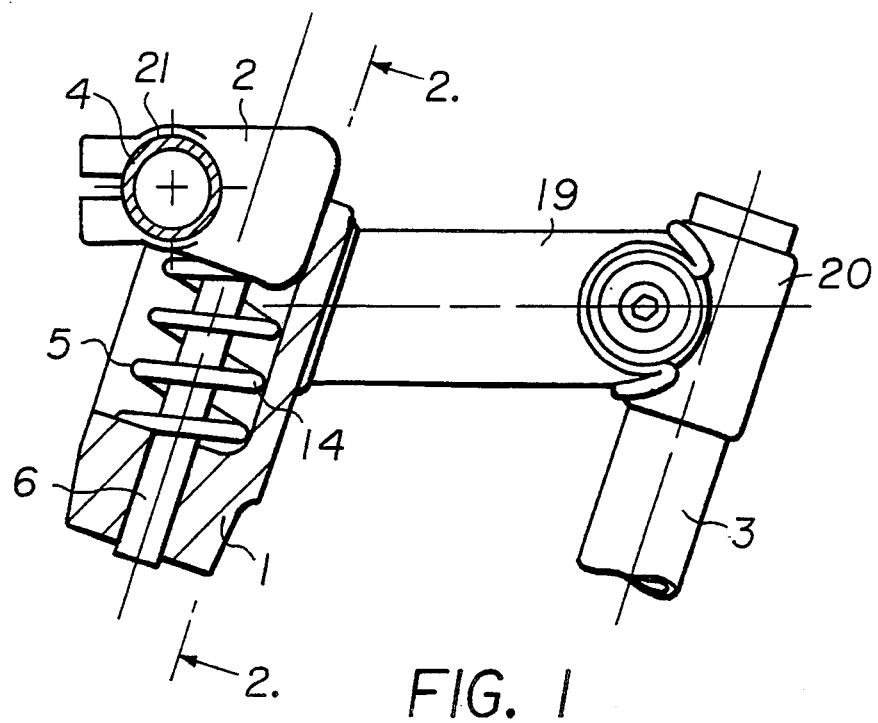
FIG. 1 is an illustrational view partially in cross-section of a cushioned mount for bicycle handlebars in accordance with a preferred embodiment of the invention applied to a front fork of a bicycle.
Figure 2:
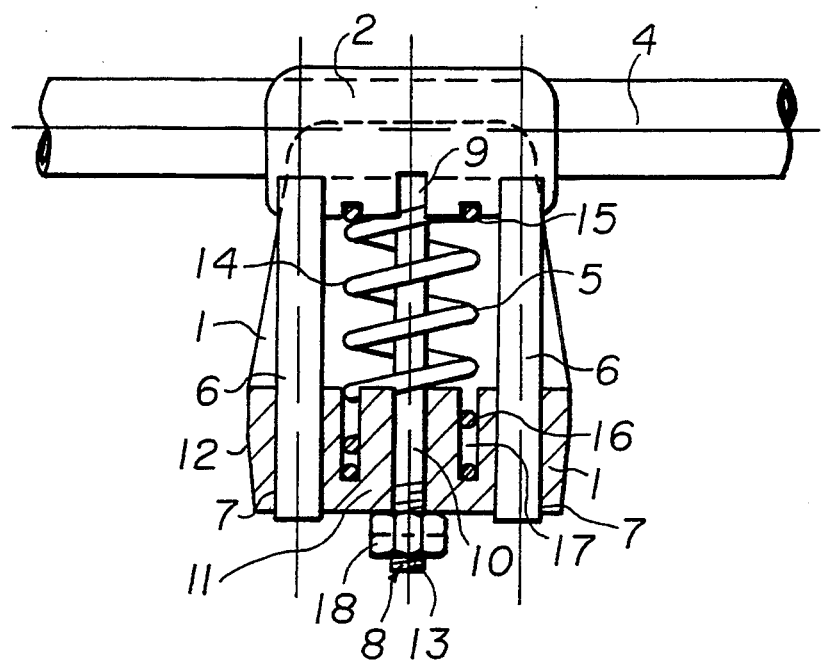
FIG. 2 is a cross-sectional view in the direction of line 2—2 of FIG. 1 illustrating the elements of the handlebar mount with the handlebars in a first position.
Figure 3:
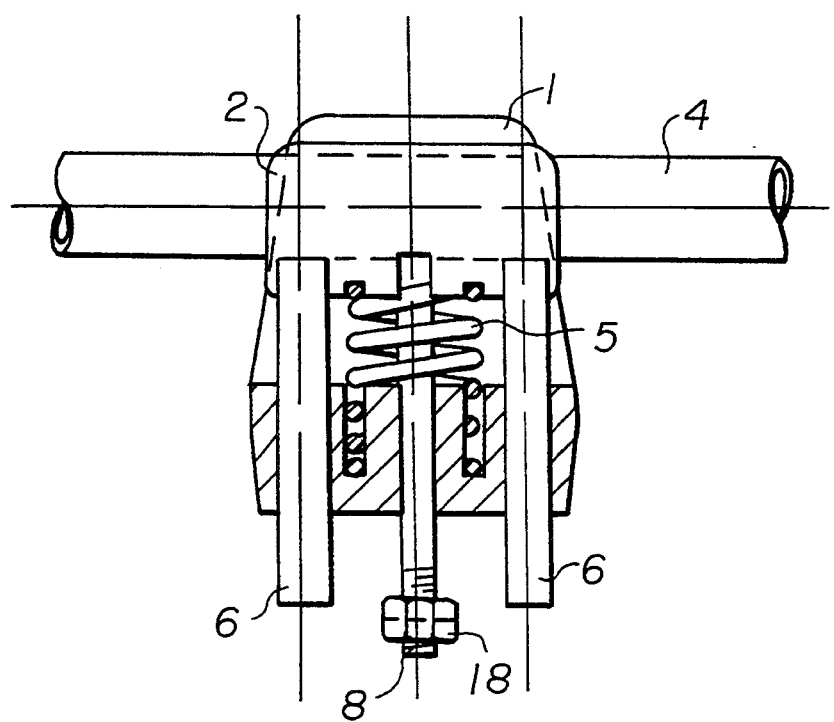
FIG. 3 is a cross-sectional view in the direction of line 2—2 of FIG. 1 illustrating the elements of the handlebar mount with the handlebars in a second position in response to shock being transmitted to the handlebars.

The practical realization of the invention is described hereinafter with reference to the drawings which illustrate a non-limiting example. The handlebar mount is divided into two parts (1, 2) of which part (1) is solidly attached to the fork post (3) while part (2) is attached to the handlebars (4). A shock absorber (5) connects the two parts (1, 2) of the handlebar mount. As illustrated in FIG. 2, the shock absorber (5) includes a central post (8) having an upper portion (9) which is secured to part (2), and a lower portion (10) which is received in a bore (11) of a base portion (12) of the first part. A lower end portion (13) of the central post extends exteriorly of the base portion. A spring (14) is disposed about the central part, and includes an upper end (15) secured to part (2) and a lower end (16) received within an annular channel (17) of the base portion. The central post and spring move vertically within the bore and annular channel, respectively, when shock is transmitted to the handlebars. Conventional threaded fasteners (18) are placed on the lower end portion of the central post to limit its range of movement in the upward direction. Two small rods (6) are positioned under the mobile upper part (2) of the mount and slide in suitable sockets (7) formed in the base portion (12) of the fixed part (1) of the mount. These rods (6) stop the handlebars from assuming an unnatural slanted position with respect to the fork post (3) due to the action of the shock absorber (5). Furthermore, the rods allow the maintenance of the sensitivity and turning precision of the handlebars (4) with respect to the fork post (3) and therefore the wheel.

The part (1) includes a connecting portion (19) which extends outwardly from the body thereof and has a sleeve (20) at one end which surrounds the fork post (3) when the handlebar mount is applied to a bicycle.

Application of the above-described preferred embodiment of the invention could lead to variations without compromising the substance of the innovative concept.

With reference to the preceding detailed description and the drawings the following claims are presented.

I claim:

1. A handlebar mount suitable for use with a bicycle having a fork post and handlebars, said handlebar mount comprising a first part being adapted to connect to the fork post, a second part defining a bore for receiving the handlebars, a spring having an upper end secured to said second part and a lower end contacting said first part, said first part including a base portion defining a first socket and a second socket, a first rod and a second rod, said first and second rods each having an upper end secured to said second part and a lower end, and said lower end of said first rod being movably received in said first socket and said lower end of said second rod being movably received in said second socket.

2. The handlebar mount of claim 1, further comprising a central post having an upper portion and a lower portion, said spring surrounds said central post, said base portion of said first part defines a central bore, and said lower portion of said central post is movably received in said central bore.

3. The handlebar mount of claim 2, wherein said spring comprises a coil spring, and said base portion defines an annular channel which receives said coil spring.

4. The handlebar mount of claim 2, further comprising a stop disposed on said lower portion of said central post exteriorly of said base portion for limiting the range of movement of said central post, said stop being spaced from said base portion in a first position of the handlebars and said stop contacts said base portion and prevents upward movement of said second part in a second position of the handlebars.

5. The handlebar mount of claim 3 wherein said first and second rods are disposed on opposite sides of said central post.

6. The handlebar mount of claim 5, further comprising a stop disposed on said lower portion of said central post exteriorly of said base portion for limiting the range of movement of said central post, said stop being spaced from said base portion in a first position of the handlebars and said stop contacts said base portion and prevents upward movement of said second part in a second position of the handlebars.

7. A handlebar mount suitable for use with a bicycle having a fork post and handlebars, said handlebar mount comprising a first part including a body portion and means for connecting to the fork post in a use condition, a second part defining a bore for receiving the handlebars and being spaced from the front fork in the use condition, said second part being adapted to undergo translational movement relative to said first part, a central post having an upper portion secured to said second part and a lower portion, a spring surrounding said central post, said spring having an upper end secured to said second part, said body portion defining an annular channel and a central bore, said spring being received within said annular channel and said lower portion of said central post being movably received in said central bore, first and second rods each having an upper end secured to said second part and a lower end, and said body portion defines a first socket which movably receives the lower end of said first rod and a second socket which movably receives the lower end of said second rod.

8. The handlebar mount of claim 7, wherein said spring comprises a coil spring.

9. The handlebar mount of claim 7, wherein said first and second rods are disposed on opposite sides of said central post.

10. The handlebar mount of claim 7, further comprising means for limiting the range of movement of said second part relative to said first part.

11. The handlebar mount of claim 10, wherein said limiting means comprises a stop disposed on said lower portion of said central post exteriorly of said body portion, said stop being spaced from said body portion in a first position of the handlebars and said stop contacts said bottom portion and prevents further upward movement of said central post in a second position of the handlebars.

12. A handlebar mount suitable for use with a bicycle having a fork post and handlebars, said handlebar mount comprising a first part including a body portion and means for connecting said first part to the fork post, said body portion defining an annular channel, the connecting means extending outwardly from said body portion, a second part defining a bore for receiving the handlebars and being adapted to undergo translational movement relative to said first part, a spring received within said annular channel and having an upper end secured to said second part, a central post having an upper portion and a lower portion, said spring surrounds said central post, said body portion defines a central bore, said lower portion of said central post being movably received in said central bore, first and second rods each having an upper end secured to said second part and a lower end, and said body portion defines a first socket which movably receives the lower end of said first rod and a second socket which movably receives the lower end of said second rod.

13. The handlebar mount of claim 12, wherein said first and second rods are disposed on opposite sides of said central post.

14. The handlebar mount of claim 12, further comprising a stop disposed on said lower portion of said central post exteriorly of said body portion for limiting the range of movement of said central post, said stop being spaced from said body portion in a first position of the handlebars and said stop contacts said body portion and prevents further upward movement of said second part in a second position of the handlebars.

15. The handlebar mount of claim 13, further comprising a stop disposed on said lower portion of said central post exteriorly of said body portion for limiting the range of movement of said central post, said stop being spaced from said body portion in a first position of the handlebars and said stop contacts said body portion and prevents further upward movement of said second part in a second position of the handlebars.

* * * * *